(12) United States Patent
Le Gal

(10) Patent No.: US 10,265,901 B2
(45) Date of Patent: Apr. 23, 2019

(54) DIE FOR MANUFACTURING A FILM BY EXTRUSION

(71) Applicant: Blue Solutions, Ergue Gaberic (FR)

(72) Inventor: Guy Le Gal, Quimper (FR)

(73) Assignee: BLUE SOLUTIONS, Ergue Gaberic (FR)

( * ) Notice: Subject to any disclaimer, the term of this patent is extended or adjusted under 35 U.S.C. 154(b) by 652 days.

(21) Appl. No.: 14/896,637

(22) PCT Filed: Jun. 10, 2014

(86) PCT No.: PCT/EP2014/061998
§ 371 (c)(1),
(2) Date: Dec. 7, 2015

(87) PCT Pub. No.: WO2014/198706
PCT Pub. Date: Dec. 18, 2014

(65) Prior Publication Data
US 2016/0107363 A1    Apr. 21, 2016

(30) Foreign Application Priority Data

Jun. 10, 2013  (FR) ...................... 13 55322

(51) Int. Cl.
*B29C 47/32* (2006.01)
*B29C 47/12* (2006.01)
(Continued)

(52) U.S. Cl.
CPC ............ *B29C 47/12* (2013.01); *B29C 47/165* (2013.01); *B29C 47/32* (2013.01);
(Continued)

(58) Field of Classification Search
CPC ............ B29C 47/0021; B29C 47/0059; B29C 47/0852; B29C 47/165; B29C 47/32
See application file for complete search history.

(56) References Cited

U.S. PATENT DOCUMENTS

| 2,624,914 A | 1/1953 | Rhodes |
| 3,096,543 A | 7/1963 | Konopacke et al. |

(Continued)

FOREIGN PATENT DOCUMENTS

| DE | 102005020432 | 11/2006 |
| EP | 1190834 | 3/2002 |

OTHER PUBLICATIONS

French Search Report, dated Feb. 10, 2014, French Application No. 1355322.
(Continued)

*Primary Examiner* — Yogendra N Gupta
*Assistant Examiner* — Joseph S Leyson
(74) *Attorney, Agent, or Firm* — Womble Bond Dickinson (US) LLP

(57) ABSTRACT

The invention relates to a die for manufacturing a film by extrusion, comprising two blocks (100, 200) that define a flow duct (110) between one another, at least one (200) of the two blocks comprising a body (210) that has a deformable portion (220) for modifying the outlet opening of the die, characterized in that means (300) for subjecting the deformable portion to a force comprise at least one bearing part (310) that extends in a general direction (V) perpendicular to the direction (L) of flow at the die outlet and comprises a first end (312) bearing against the deformable portion (220), adjusting means (350, 380) in contact with the bearing part (310) modifying the position of this part.

18 Claims, 2 Drawing Sheets

Figure 1:
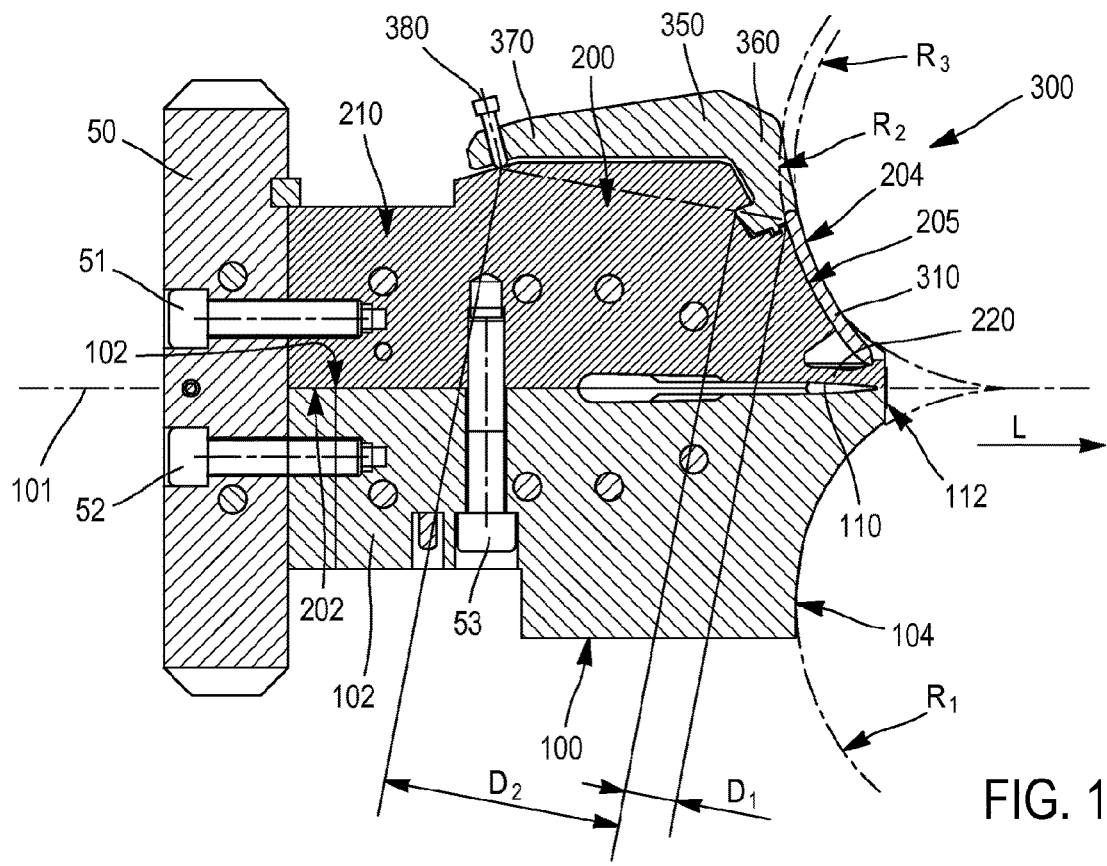

(51) Int. Cl.
*B29C 47/16* (2006.01)
*B29C 47/00* (2006.01)
*B29C 47/08* (2006.01)
*B29C 47/92* (2006.01)

(52) U.S. Cl.
CPC ...... *B29C 47/0021* (2013.01); *B29C 47/0852* (2013.01); *B29C 47/92* (2013.01); *B29C 2947/92647* (2013.01)

(56) References Cited

U.S. PATENT DOCUMENTS

| | | |
|---|---|---|
| 3,956,056 A | 5/1976 | Boguslawski et al. |
| 3,988,097 A * | 10/1976 | Anders ............... B29C 47/0816 425/192 R |
| 4,060,368 A | 11/1977 | Theysohn |
| 4,990,079 A * | 2/1991 | Lorenz ............... B29C 47/0816 425/141 |
| 6,287,105 B1 | 9/2001 | Druschel et al. |
| 2012/0024226 A1* | 2/2012 | Nakano ................ B29C 47/165 118/663 |
| 2013/0020737 A1 | 1/2013 | Ulcej |

OTHER PUBLICATIONS

International Search Report with English Language Translation, dated Sep. 8, 2014, Application No. PCT/EP2014/061998.

* cited by examiner

DIE FOR MANUFACTURING A FILM BY EXTRUSION

The present invention relates to the field of dies for the manufacture of films by extrusion.

The present invention applies especially to the field of manufacture by extrusion of films for making electric power storage assemblies, such as batteries. The invention applies for example to making a cathode or electrolyte film, especially in the case of a polymer lithium battery for which the battery is fitted with a solid electrolyte.

Dies for the extrusion of flat films are already known in the prior art. These dies are generally placed at the outlet of an extrusion screw or a feed pump made of molten raw material and modify the profile of the viscous material flow generally moving from a cylindrical flow to a flat flow.

When the aim is to make a battery film, it is important that the film at the outlet of the die is as uniform as possible in terms of thickness and output speed, and this at any point of the extrusion width, without which the film could be damaged during the laminating step directly following the extrusion step. When the film is not uniform, laminating can in fact generate mechanical weaknesses or under-thicknesses, causing variations in the electrical characteristics which impair operation of the battery prepared by means of the film.

Now, during the passage in the die, load losses occur which often generate heterogeneities in the film. Due to this the film tends especially to be finer at its transversal ends than in its central part at the die outlet. Also, the mechanical performance of the die (especially flexion of the central part of the die due to pressure) can also generate heterogeneities in the film at output.

To resolve this type of problem, dies comprising two parts between which is formed a flow duct (or flow indentation) are already known. At least one of the parts along the duct comprises a portion in the form of a lip configured to be deformable elastically and extending in the vicinity of the outlet mouthpiece of the duct and adjusting screws intended to bear on different fractions of the lip, according to its transversal dimension, to modify its distance relative to the other part of the die.

However, due to the bulk of the adjusting screw at outlet of the die this type of die does not place the laminating means positioned immediately at the outlet of the die, in close proximity to said outlet. Now, the proximity of the laminating cylinders of the mouthpiece of the die improve the quality of the finished film by limiting its transversal swaging, a phenomenon which can occur when the film is not placed on a support. The air gap adjusting screws such as described hereinabove are in fact too bulky to be installed in the vicinity of the laminating cylinders and retain a short distance between the die outlet and the point of convergence of the laminating cylinders.

The aim of the die according to the invention is to resolve these problems.

For this purpose, the invention proposes a die for the manufacture of a film by extrusion, which comprises two blocks together defining a flow duct, at least one of the two blocks comprising:
 a body having a portion configured to be elastically deformable and extending in the vicinity of the outlet mouthpiece of the duct, and
 adjustable biasing means of this deformable portion of the body for deforming the deformable portion for selectively modifying the distance between the latter and the other block of the die, wherein the biasing means comprise:
 at least one bearing part positioned to be supported on the deformable portion by extending according to a general direction perpendicular to the flow plane at die outlet, each bearing part comprising a first end supported on the deformable portion,
 adjusting means mobile relative to the body, capable of exerting action on a second end of each bearing part opposite the first end and away from the die outlet so as to modify the position of this bearing part,
characterized in that the biasing means comprise also at least one intermediate lever, the or each lever being placed between the or at least one bearing part so as to bear against its second end, and adjusting means.

According to another advantageous characteristic of the invention the biasing means comprise a plurality of bearing parts which extend according to a general direction perpendicular to the flow plane, and are configured and positioned to bear by a first of their ends on different fractions of the deformable portion distributed according to the transversal direction of the die along the mouthpiece of the duct, the second ends of the bearing parts, away from the die outlet, being connected to adjusting means adapted to modify the position of each of these parts independently of that of at least one other bearing part.

Therefore, as in the prior art, because of the deformable portion located at the end of one of the blocks at least of the die, the air gap between the two blocks can be best regulated. The bearing parts vary the regulating of the position of the deformable portion according to the transversal direction of the die, enabling even more precise regulating than according to the prior art due to the modalities according to the invention which will be described later.

Also, delocalising the adjusting means so that they are no longer at the mouthpiece of the die but where a bearing part is interposed between the latter and the deformable portion helps reduce the bulk of the regulating system at the end of the die and benefits an unmatched freedom of design of the die. The die can therefore be configured such that it is positioned as closely as possible to the cylinders.

Preferably, with the body of the block or at least one of the blocks having an end surface extending in a general direction transversal to the flow plane and adjacent to the outlet mouthpiece of the duct, the biasing means are configured such that the adjusting means extend upstream of the end surface relative to the direction of flow. They are not positioned between the end surface of the die and the laminating cylinders.

The bearing parts are arranged preferably essentially over the entire transversal dimension of the die. But they can be arranged on a portion of the die only according to this dimension. They are also arranged so as to be side by side and preferably in contact with each other. This boosts the precision of the adjusting.

Each bearing part is preferably connected to respective adjusting means.

Each lever is especially formed by an L with two branches articulated in rotation on the body of the block comprising the adjustable portion, the shorter branch comprising an end supported on the second end of the corresponding bearing part to push this part towards the deformable portion, while the longer branch cooperates with the adjusting means.

The ratio on the one hand between the distance between the rotation axis of the lever relative to the body of the corresponding block and the support point of each adjusting means on the lever and on the other hand the distance between the rotation axis and the support point of the lever on each bearing part is greater than 2, preferably between 4 and 6, advantageously of the order of 5. A lever the ratio of which is greater than 1 is however naturally also covered by the invention.

The levers in fact regulate the air gap between the two blocks even more precisely, since the position of the deformable portion can be regulated very finely without the pitch of the selected adjusting means being a limiting factor.

The block fitted with the deformable portion preferably has a complementary depression of a projection formed on the lever, especially in the vicinity of the support point of the lever on the bearing part, for keeping this lever and the corresponding bearing part in position on the block.

The die can also comprise at least one set of several levers in cascade, the or each set being placed between the or at least one of the bearing parts and the respective adjusting means, to demultiply the ratio between the displacement of each adjusting means and that of each bearing part connected to said adjusting means, which increases the fineness of adjustment as a function of need.

The blocks are essentially symmetrical relative to the plane of flow such that the mouthpiece forms a projection relative to the rest of the die. This therefore brings the die of the laminating cylinders and the mouthpiece of the die of the convergence area of the cylinders even more closely together at the level of which the air gap between the cylinders is less, and corresponding to the laminating area. The mouthpiece of the die can especially be located according to the direction of flow between at least one part of the cylinders and the convergence area.

The end surfaces of the blocks, which extend in a general direction transversal to the flow plane adjacent to the outlet mouthpiece of the duct, are concave and preferably overall have a geometry cylindrical in revolution, complementary to the envelope of laminating cylinders located downstream. The die therefore matches the form of the laminating cylinders.

The body of the block(s) comprising the deformable portion comprises an end surface also concave, the bearing parts tracing the concave contour of the body by having an essentially constant thickness. The bearing parts are therefore also concave.

This configuration, permitted by delocalisation of the adjusting means upstream of the die, brings together the mouthpiece of the die of the convergence area of the cylinders and also retains the most solid conformation possible of the body of the die in the vicinity of the mouthpiece, giving the latter rigidity in the vicinity of the mouthpiece, which reduces the elastic deformation of the mouthpiece and therefore increases the regularity of the film at output.

The thickness of the deformable portion considered according to a direction perpendicular to the plane of flow is between 2 and 5 mm, preferably of the order of 4 mm. Its length in the direction of flow is preferably at least greater than 2.5 times its thickness, which makes its deformation easy. It in fact preferably forms a lip extending in the flow plane projecting from the body of the block according to the direction of flow.

The deformable portion has a substantially constant thickness over its entire length, but has a projecting rib forming excess thickness at the level of its free end adjacent to the outlet of the die to serve as restraint for the biasing means, especially the bearing part(s).

Each bearing part has a width less than 50 mm according to the transversal dimension of the die, preferably greater than 20 mm and advantageously between 20 and 30 mm. This width is the optimal width for fine adjustment of the air gap over the entire width of the die while saving manufacturing costs. It could in fact be possible to multiply the number of bearing parts by decreasing the width of each (which would also increase manufacturing costs) but this would not improve the adjusting according to this direction as the deformable portion is a portion in a single piece and the action of a bearing part on a fraction of the latter has an influence on the positioning of the adjacent fractions.

Each bearing part can have a thickness of between 2 and 5 mm, typically of the order of 4 mm, a reduced thickness increasing the solid character of the body of the die, and a length greater than 10 times, advantageously greater than 15 times, its thickness. It is made especially of metal.

The adjusting means can comprise at least one adjusting screw, the or each screw being capable of exerting action (by way of one or more levers) on the second end of the bearing part(s).

The adjusting means can also comprise at least one thermal expansion part, the or each expansion part being capable of exerting action on the or one of the bearing parts (optionally by means of one or more levers), and at least one heating means connected respectively to the or each expansion part for varying the dimensions of the thermal expansion part in a controlled manner as a function of temperature. This more finely adjusts the position of the adjusting means.

The expansion means can also be a screw and the heating means a warming nut, for example.

The heating means can be intended to adjust the position of a bearing part in by way of complement to a standard adjusting screw. A first approach—adjusting step can be made by means of the standard screw, and when in the vicinity of the preferred position, fine adjustment can be conducted by means of the heating means.

The adjusting means can be actuated manually or automatically, for example as a function of measurements of the local thickness (or optionally of the speed) of the film done with equipment located at the die or laminating outlet. Such measuring equipment can control the heating means or a motor which actuates each of the adjusting screws to regulate the die to produce film of better possible quality any time during manufacture.

The deformable portion of the die is also preferably monobloc over the entire transversal dimension of the die to prevent material leaks and heterogeneities at the level of the thickness at die outlet.

It should be noted also that each of the two blocks can have a deformable portion connected to biasing means such as described hereinabove.

Figure 3:
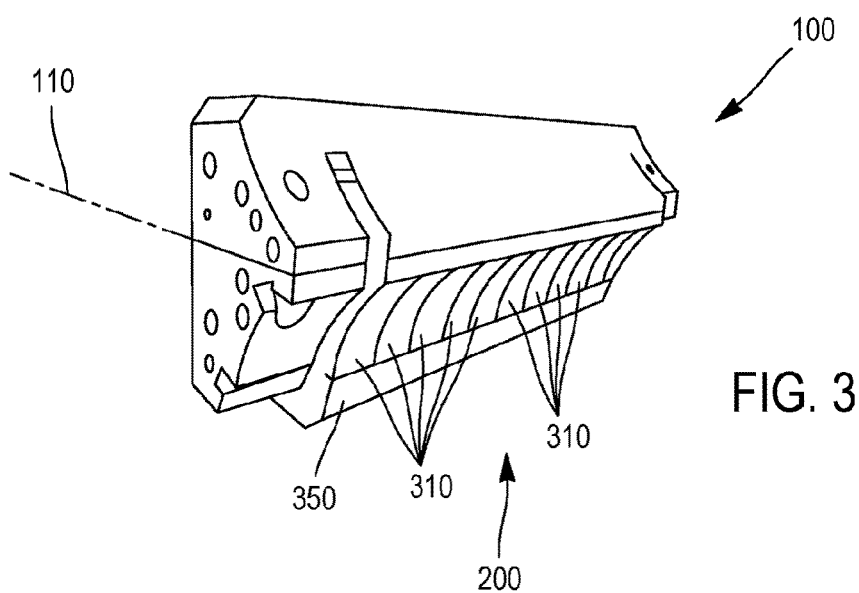
Figure 2:
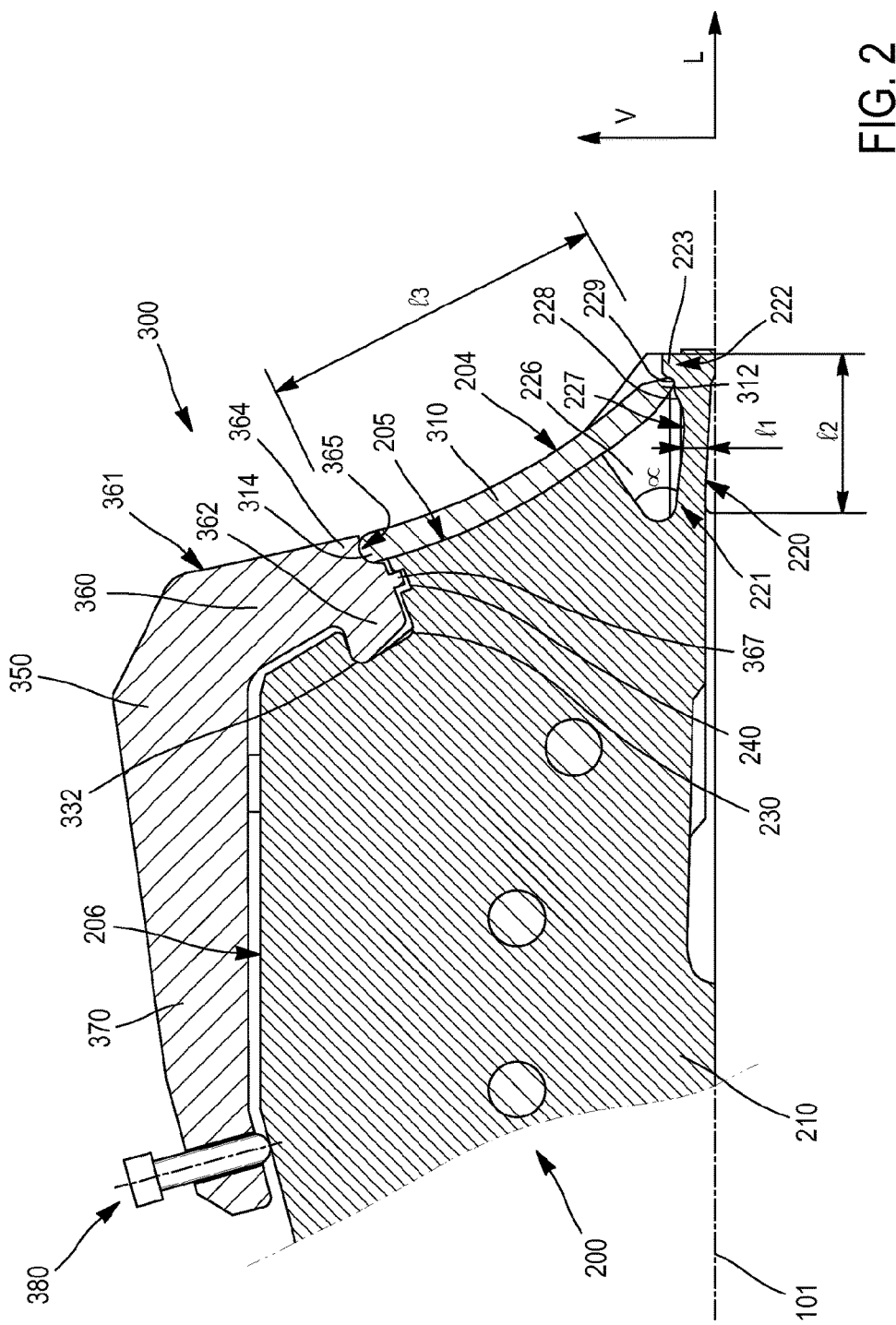

Other characteristics, aims and advantages of the present invention will emerge from the following detailed description with respect to the appended drawings given by way of non-limiting examples in which:

FIG. 1 illustrates a schematic view in transversal section of a die according to the present invention, FIG. 2 illustrates an enlarged scale view of the biasing means according to the present invention, and FIG. 3 illustrates a perspective view of a die according to a variant of the present invention to illustrate especially the production of biasing means in the form of a plurality of bearing parts.

An embodiment of the die according to the invention will now be described with respect to the cut of the die as shown in FIGS. 1 and 2.

The die according to the present invention shown in FIG. 1 comprises two main blocks: a first fixed block 100 and a second adjustable block 200.

The two blocks 100 and 200 are fixed relative to each other by way of means referenced schematically 50 to 53 in the appended FIG. 1. These means 50 to 53, known per se, and which can be the subject matter of many variant embodiments, will not be described in greater detail below.

According to the arbitrary illustration given in FIG. 1, the first fixed block 100 forms the lower part of the die while the second adjustable block 200 forms the upper part of the die. But the reverse arrangement can be given. As illustrated in FIG. 3, the adjustable block 200 can in fact form the lower part of the die, while the fixed block 100 forms the upper part of the die. According to another variant according to the present invention, the two blocks 100 and 200 can be adjustable. The die could also be arranged to form a vertical film.

Between these two blocks 100 and 200 there is a space 110 forming the duct or the indentation enabling the flow of material coming from the extruder and the transformation of the flow of material from a flow of cylindrical form, at the inlet of the die, to a flow in the form of film, or essentially plane, at the outlet of the die. The space 110 located between the two blocks 100 and 200 is therefore cylindrical in shape at the inlet end of the die and is arranged only in the central part of the die. It has a finer thickness and extends essentially over the entire transversal dimension of the die to the opposite end 112 of the die, also called a mouthpiece, via which the film formed in the die exits. The above transversal dimension extends perpendicularly to the plane of FIGS. 1 and 2.

The fixed 100 and adjustable 200 blocks, can be the object of many variant embodiments. On one face they preferably comprise complementary bearing surfaces 102, 202 forming a joint plane 101, also called flow plane, when the two blocks 100, 200 are connected. The above faces 102, 202 are overall planar, except for the recesses formed to make the flow space 110. This joint plane 101 contains the flow direction L of the material in the die, parallel to the plane of FIG. 1, as well as the transversal direction perpendicular to the plane of the figure.

The end surfaces of the two blocks 100 and 200 directed towards the laminating device located downstream of the die are referenced 104, 204. The above laminating device is not shown in the appended figures, to simplify illustration. It generally comprises at least one pair of laminating cylinders which converge at the level of a generatrix located in the joint plane 101. The cylinders are placed respectively with one facing the surface 104 of the block 100 and the other facing the surface 204 of the block 200. These surfaces 104 and 204 which extend in a general direction transversal to the joint plane 101 are preferably concave and overall have a cylindrical geometry of revolution, complementary to the envelope of the laminating cylinders located downstream to allow the mouthpiece 112 to be located in the vicinity of the convergence area of the cylinders, as will be explained later.

The fixed and adjustable blocks 100, 200 of the die are preferably made of metal. The fixed block 100 comprises a body made in the mass, in a single piece, so as to be rigid and not deform during use.

The adjustable block 200 also comprises a body 210 but the latter comprises, at its end intended to be placed in the vicinity of the mouthpiece 112, a deformable portion 220, forming a lip extending according to the entire transversal dimension of the die (orthogonal to the plane of FIGS. 1 and 2), towards the exterior in the direction of flow (also called longitudinal direction L).

The thickness 11 of the lip 220 considered according to a direction V (here corresponding to the vertical direction) perpendicular to the plane of flow is preferably at least substantially constant between its base 221 attached to the body 210 and its free end 222. This thickness 11 is typically a few millimeters, especially between 2 and 5 mm and more particularly 4 mm. Its length 12 in the direction of flow L is typically at least greater than 2.5 times its thickness, and preferably of the order of 20 to 30 mm. Due especially to its dimensions, the lip 220 is therefore deformable by flexion according to said direction V.

The lip 220 is preferably formed by making a recess 226 in the body 210 between the lip 220 and the rest of the body, more precisely in the surface 205 of the body 210 intended to be placed in the vicinity of the laminating cylinders.

According to the embodiment shown in FIGS. 1 and 2, the recess 226 is formed by a groove in the form of a dihedron having at the level of its base an angle α of the order of 45° and the mouthpiece of which terminates on the surface 205.

More precisely still as evident in FIGS. 1 and 2, the geometry of the recess 226 is preferably such that the lip 220 has a thickness substantially constant over its entire length, between the base of the recess 226 and the outlet mouthpiece of the die, but however has a projecting rib 223 forming excess thickness at the level of its free end 222 adjacent to the outlet of the die. For this the face 227 of the recess 226, which delimits the lip 220, preferably has a clearance 228 in the vicinity of its free end, forming a recess 226 with converging edges.

This excess thickness 223 serves to retain the biasing means 300 which will be described later.

According to the preferred embodiment shown in the appended FIGS. 1 and 2, the biasing means 300 comprise in combination at least one bearing part 310, a lever 350 and actuation and adjusting means 380 of the lever 350, also called adjusting means or actuation means throughout the application.

The adjustable block 200 comprises at least one bearing part 310 intended to stress the lip 220. More precisely the adjustable block 200 preferably comprises a plurality of bearing parts 310. These extend against the surface 205 of the body, essentially according to the almost vertical direction V to exert force on the deformable portion 220 in this direction.

More particularly, each bearing part 310 follows the concave contour of the surface 205 of the body 210 of the block 200 to its end where the mouthpiece 112 is located. Because of this, the end surface 204 of the adjustable block, delimited by the biasing means and especially the bearing parts 310 in the embodiment described here, has the same concave profile as that of the surface 205. The bearing parts 310, made of metal, have a constant and reduced thickness, for example between 2 and 5 mm and typically of the order of 4 mm, such that their bulk is minimal. Because of this, for the same bulk, the body 210 of the die can be very solid, and easily resist deformation due to pressure. The length 13 of each bearing part 310, according to the general direction V, is typically greater than 10 times, advantageously greater than 15 times, its thickness.

As is evident from FIG. 3, a plurality of bearing parts 310 is preferably provided arranged side by side over the entire transversal dimension of the surface 205 of the body 210 of block 200, near the mouthpiece 112.

The dimension, called width, of the bearing parts is less than 50 mm according to the transversal dimension of the die and preferably greater than 20 mm.

These parts 310 are preferably each configured to present a width, according to this transversal direction, of around 20 to 30 mm.

It is in fact unattractive to considerably decrease the transversal dimension of the bearing parts 310 since the deformable portion is made in a single piece and the action of each bearing part 310 on the deformable portion 220 therefore has an effect on the fraction against which it is supported but also on the fractions of the deformable lip 220 located in the vicinity of said fraction. Adjustment would therefore not be necessarily finer if the number of bearing parts 310 were to be multiplied infinitely.

The inventors have determined that this width is a fair compromise between the possibility of local adjustment of the position of the deformable portion 220 and the cost of the die, with the increase in the number of bearing parts 310 not improving the adjustment, given that the deformable portion 220 is in a single piece and local deformation of the latter is therefore not without effect on the deformation of the adjacent portions.

An intermediate part, also called lever 350, is connected to each part 310. Each lever 350 is borne by the adjustable block 200 and is supported on the end of the bearing part 310 away from the mouthpiece 112. The levers are also arranged side by side over the entire transversal dimension of the adjustable block 200.

In this way the bearing parts 310 are arranged between the deformable lip 220 and the levers 350. Each bearing part 310 rests by a first end 312 on the lip 220 and is in contact via its opposite end 314 against one of the levers 350.

Each lever 350 forms an L with two branches 360, 370.

The shorter branch 360 comprises an end 364 supported on the upper end 314 of the corresponding bearing part 310 to push this part 310 downwards so that it influences the position of the adjustable portion 220.

More precisely the tranches of the two ends 312 and 314 of each bearing part 310 are overall rounded convex. The excess thickness 223 provided on the free end of the deformable lip 220 preferably has on its face directed towards the interior of the recess 226 an indentation or concave groove 229 in which the adjacent end 312 of each bearing part 310 penetrates to keep the latter in contact with the lip 220 and prevent the bearing part(s) from slipping off the lip under the stress of means 350. Also, the end 364 of the lever 350 preferably has on its face adjacent to the corresponding part 310 an indentation or concave groove 365 in which the adjacent end 314 of the bearing part 310 penetrates to keep the latter in contact with the lever and prevent the bearing part from slipping off the lever 350.

The shorter branch 360, placed against the surface 205 of the body of the block 200, fits via its free end 364 serving as support for the part 310, in a complementary form 230 of the body 210 of the adjustable block 200.

The longer branch 370 is placed against the upper surface 206 of the block 200 overall parallel to the joint plane 101.

At the end of the longer branch 370 of the L-shaped lever 350 is placed at least one screw 380 forming actuation means of the position of the lever 350 and accordingly of the position of the corresponding bearing part 310 and of the deformable lip 220.

For this purpose, the screw 380 is preferably in contact in a complementary tapping formed in the lever 350 in the vicinity of the end of its longer branch 370 and rests via its free end on the upper surface 206 of the body 210.

The lever 350 is also supported against the body 210 of block 200 in a place 232 also located in the vicinity of the end of the shorter branch 360 of the L-shaped lever, at the level of a projection 362 made at this end, towards the interior of the concavity of the L, and which engages in a corresponding recess 230 of the body 210.

The lever 350 can be mobile in rotation about an axis corresponding essentially to the above area 232 by which the lever 350 is supported on the block 210. This point of contact could be replaced by an articulation about an axis.

More precisely according to the embodiment shown in FIGS. 1 and 2, the projection 362 has overall a straight rectangular section and the recess 230 also has a straight overall rectangular section complementary to that of the projection 362. "Complementary" means that the straight section of the recess 230 is overall homothetic to that of the projection 362 but of slightly larger dimension to allow some pivoting clearance of the projection 362 in the recess 230. More precisely still the rotation axis of the lever 350 relative to the block 200, under the effect of actuation means 380, is formed by the greater angle of the recess 230, at the level of the area 232, according to the illustration of FIGS. 1 and 2.

It is clear according to the illustration given in FIGS. 1 and 2 that the distance D1 between the axis 232 and the support point 365 of the lever 350 on the bearing part 310 is much less, more particularly around 5 times less, than the distance D2 between the axis 232 and the support point of the actuation screw 380 on the body 210. More generally according to the invention the lever ratio of the intermediate piece 350, that is, the D2/D1 ratio is greater than 2 and preferably between 4 and 6. If the bulk allows, this ratio can exceed 10.

The block 200 preferably also has a complementary depression 240 of a projection 367 formed on the intermediate piece or lever 350 to keep this lever 350 and the corresponding bearing part 310 in position on the block 200. For this purpose the body 210 of the deformable block 200 comprises a channel 240 in which is intended to engage the projections 367 of each of the levers 350 in the vicinity of their point of contact with the corresponding bearing part 310. The channel 240 terminates on a face of the block 210 opposite the joint plane 101. This cooperation in form prevents the lever 350 and optionally the corresponding bearing part 310 from falling into the rolling mill located at the outlet of the die in the event of releasing of the screw 380 forming the actuation means.

By way of variant for this purpose, the channel 230 formed on the body 210 can have opening edges at least slightly convergent, while the complementary projection(s) 362 formed on the lever 350 has/have a form which widens out slightly in the direction of its free end. Each projection 362 is engaged in the channel 230 by sliding in the transversal direction, but can be withdrawn by simple relative translation perpendicularly to the external surface of the body 210 and ensures secure holding of the lever 350 on the body 210. Each bearing part 310 in contact on the one hand on the excess thickness 223 of the lip 220 and on the other hand in the complementary form 365 of the lever 350 is also held very securely on the block 210.

Each intermediate piece or lever 350 varies the position of the corresponding bearing part 310 and therefore that of a fraction or area of the deformable lip 220, by clamping or releasing of the screw 380. In fact, displacement of the screw 380, whereof the end is fixed relative to the body, pivots the lever 350 about the axis 232 and consequently shifts the end 364 of the lever relative to the body 210. The lever biases the bearing parts 310 by moving more closely to or away from the joint plane 101. Its presence therefore has considerable design latitude in terms of adjusting the position of the bearing part 310.

Each bearing part 310 is preferably supported against a separate intermediate piece 350 at its end 314 opposite the first end 312 biasing the deformable lip 220. In other terms a number of levers 350 identical to the number of bearing parts 310 is preferably provided, each of the levers 350 biasing a respective bearing part 310 and each lever 350 being connected to a respective adjusting screw 380.

Because of the lever system 350, the position of each bearing part 310 acting on the deformable portion 220 can be adjusted very finely, by action on the actuation means 380, since the ratio between the displacement distance of the actuation means 380 and that of each bearing part 310 is around 5. Also, this applies less force for regulating the actuation means 380 than that applied to each bearing part 310 and therefore to the deformable portion 220.

It is also evident that the die has at its end in which the mouthpiece 112 is arranged a particular form defined by the above surfaces 104 and 204. Each block 100, 200 has in fact at this level an external concave surface 104, 204 and more precisely has a complementary profile of a portion of cylinder corresponding to the laminating cylinders intended to be placed downstream. The surface 104 is delimited by the body of the fixed block 100 whereas the surface 204 is delimited by the bearing parts 310 which bear on a surface 205 of the body of adjustable block 200 by tracing its contour. More particularly, the blocks 100, 200 are essentially symmetrical relative to the flow plane 101 such that the mouthpiece 112 forms a projection relative to the rest of the die. The profile of the die is therefore similar to a convex V whereof the mouthpiece 112 forms the tip. Due to this symmetry, it is clear that the surface 205 of the body of adjustable block is recessed relative to the surface 104 of the body of the fixed block.

In this way, and in particular due to the particular concave and cylindrical form, selected for blocks 100 and 200, the outlet of the die can be placed close to the convergence area of the laminating cylinders which will laminate the film and reduce its thickness at the die outlet. This stabilises the film between the extrusion and laminating steps and also limits the phenomenon of restraint, therefore improving the quality of the finished film.

Such a configuration is possible because of the invention due of the fact that the adjusting means 380 are moved away from the mouthpiece 112 of the die and the design of the bearing parts 310 is simple, these bearing parts able to be formed from strips pressed against the external surface 205 of the body of the block 200.

The bearing parts 310 which are placed at the end of the die and therefore trace the contour of the end surface 205 of the body 210 of the die, accordingly also have a concave form complementary to the portions of cylinder as already indicated earlier. Because they bear against the body 210 of the block 200 over a majority of their length this prevents the bearing parts from burning.

It is evident that the die according to the invention can comprise many variants relative to the embodiments described hereinabove, for example:

- each body of block 100, 200 can be configured in a single piece or in several pieces, the first piece comprising for example the indentation 110 and the second piece forming the deformable lip 220,
- the two blocks 100, 200 can comprise deformable portions 220 and bearing parts 310,
- the bearing parts 310 can extend only over a portion of the transversal dimension of the die, especially in its central part, to combat the effect of flexion in the central part of the die.
- the bearing parts 310 can also not be arranged rigorously side by side, that is, rigorously adjacent,
- the adjustable block 200 can comprise several levers in cascade, between the bearing parts 310 and the actuation means 380, demultiplying the ratio between the displacement of the actuation means 380 and that of each bearing part 310,
- the actuation means 380 can comprise a thermal expansion part and heating means placed in the vicinity of said part to vary its dimensions in a controlled manner as a function of temperature,
- the profile of the die in the vicinity of the mouthpiece could be planar or convex,
- the distance ratios D1/D2 are not limited to the values previously described,
- the forms of the lever 350 of each bearing part 310 or of the deformable portion 220 are not limited to what has been described previously.

The portion or deformable lip 220 is preferably monobloc over the entire transversal dimension of the die to prevent material leaks from occurring at the level of the mouthpiece.

In FIG. 1 the radius of the concave and cylindrical surface 104 of the block 100 are referenced as R1, the radius of the concave and cylindrical surface 205 of the block 200 as R2 and the radius of the concave and external cylindrical surface 204 of the bearing parts 310 as R3. The radii R1 and R3 are preferably substantially identical and complementary to that of the laminating cylinders located downstream. The radius R2 is greater than the radius R3 of the value of the thickness of the bearing parts 310. It is also noted that the external surface 361 of the shorter branch 360 of the lever 350 preferably has continuity with the concave curvature of the external surface of the bearing parts 310 so as not to disturb the adjacent installation of the downstream laminating cylinders.

The invention claimed is:

1. A die for the manufacture of a film by extrusion, comprising two blocks (100, 200) defining between them a flow duct (110), one (200) at least of the two blocks comprising:

a body (210) having a portion (220) configured to be elastically deformable and extending in the vicinity of an outlet mouthpiece (112) of the duct, and adjustable biasing means (300) of this deformable portion (220) of the body (210) to deform the deformable portion (220) to selectively modify the distance between the latter and the other block (100) of the die, which adjustable biasing means (300) comprise:

at least one bearing part (310) positioned to be supported on the deformable portion (220) by extending according to a general direction (V) perpendicular to a flow plane (101) at a die outlet defined by the outlet mouthpiece, each bearing part (310) comprising a first end (312) supported on the deformable portion (220), and adjusting means (350, 380) also mobile relative to the body (210), capable of exerting action on a second end (314) of each bearing part (310) opposite the first end (312) and away from the die outlet so as to modify the position of this part, wherein the biasing means comprising at least one intermediate lever (350), the or each lever being placed between the or one of the bearing parts (310), so as to be supported against its second end, and the adjusting means (380), wherein the body (210) of the block(s) (200) comprising the deformable portion comprises an end surface (205) also overall concave, the bearing parts (310) following the concave contour of the body (210) by having an essentially constant thickness.

2. The die according to claim 1, wherein the adjustable biasing means comprise a plurality of the bearing parts (310) which extend according to a transversal direction generally perpendicular to the flow plane, configured and positioned to bear by a first of their ends (312) on different fractions of the deformable portion (220) distributed according to the transversal direction of the die along the mouthpiece of the duct, the second ends (314) of the bearing parts (310), away from the die outlet, being connected to respective one of a plurality of the adjusting means (350, 380) adapted to modify the position of each of these parts (310) independently of that of at least one other bearing part.

3. The die according to claim 1, wherein the body (210) of the or at least one of the blocks (200) having an end surface (204) extending in a general direction transversal to the flow plane and adjacent to the outlet mouthpiece (112) of the duct, the adjustable biasing means are configured such that the adjusting means (380) extend upstream of the end surface (205) relative to a direction of flow (L).

4. The die according to claim 1, wherein each lever is formed by an L having two branches (360, 370) articulated in rotation on the body (210) of the block (200) including the adjustable portion (220), the shorter branch (360) comprising an end (364) supported on the second end (314) of the corresponding bearing part (310) to push this part (310) towards the deformable portion (220), while the longer branch (370) cooperates with the adjusting means (380).

5. The die according to claim 1, wherein a ratio between on the one hand a distance (D2) between a rotation axis (232) of the lever relative to the body of the corresponding block and a support point of each adjusting means (380) on the lever (210) and on the other hand a distance (D1) between the rotation axis (232) and a support point (365) of the lever (350) on each bearing part (310) is greater than 2.

6. The die according to claim 1, wherein the block (200) fitted with the deformable portion (220) has a depression (240) complementary to a projection (367) formed on the lever (350) to keep this lever (350) and the corresponding bearing part (310) in position on the block (200).

7. The die according to claim 1, wherein end surfaces (104, 204) of the blocks (100, 200) which extend in a general direction transversal to the flow plane (101) adjacent to the outlet mouthpiece (112) of the duct are concave.

8. The die according to claim 1, wherein the deformable portion (220) has a substantially constant thickness over its entire length, but has a projecting rib (223) forming an excess thickness at the level of its free end (222) adjacent to the outlet of the die to serve as restraint for the biasing means (300).

9. The die according to claim 1, wherein the blocks (100, 200) are essentially symmetrical relative to the flow plane (101) such that the mouthpiece (112) forms a projection relative to the rest of the die.

10. The die according to claim 1, wherein the adjusting means (380) comprise at least one thermal expansion part, the or each expansion part being capable of exerting action on the or one of the bearing parts, and at least one heating means connected respectively to the or each expansion part to vary the dimensions of the thermal expansion part in a controlled manner as a function of the temperature.

11. The die according to claim 1, wherein the adjusting means (380) comprise at least one adjusting screw, the or each screw being capable of exerting action on the or one of the bearing parts (310).

12. The die according to claim 1, wherein the deformable portion (220) is monobloc over the entire transversal dimension of the die.

13. A die for the manufacture of a film by extrusion, comprising two blocks (100, 200) defining between them a flow duct (110), one (200) at least of the two blocks comprising:
a body (210) having a portion (220) configured to be elastically deformable and extending in the vicinity of an outlet mouthpiece (112) of the duct, and
adjustable biasing means (300) of this deformable portion (220) of the body (210) to deform the deformable portion (220) to selectively modify the distance between the latter and the other block (100) of the die, which adjustable biasing means (300) comprise:
at least one bearing part (310) positioned to be supported on the deformable portion (220) by extending according to a general direction (V) perpendicular to a flow plane (101) at a die outlet defined by the outlet mouthpiece, each bearing part (310) comprising a first end (312) supported on the deformable portion (220), and
adjusting means (350, 380) also mobile relative to the body (210), capable of exerting action on a second end (314) of each bearing part (310) opposite the first end (312) and away from the die outlet so as to modify the position of this part,
the biasing means comprising at least one intermediate lever (350), the or each lever being placed between the or one of the bearing parts (310), so as to be supported against its second end, and adjusting means (380),
wherein the block (200) fitted with the deformable portion (220) has a depression (240) complementary to a projection (367) formed on the lever (350) to keep this lever (350) and the corresponding bearing part (310) in position on the block (200).

14. The die according to claim 13, characterized in that the body (210) of the or at least one of the blocks (200) having an end surface (204) extending in a general direction transversal to the flow plane and adjacent to the outlet mouthpiece (112) of the duct, the adjustable biasing means are configured such that the adjusting means (380) extend upstream of the end surface (205) relative to a direction of flow (L).

15. The die according to claim 13, characterized in that each lever is formed by an L having two branches (360, 370) articulated in rotation on the body (210) of the block (200) including the adjustable portion (220), the shorter branch (360) comprising an end (364) supported on the second end (314) of the corresponding bearing part (310) to push this part (310) towards the deformable portion (220), while the longer branch (370) cooperates with the adjusting means (380).

16. The die according to claim 13, characterized in that a ratio between on the one hand a distance (D2) between a rotation axis (232) of the lever relative to the body of the corresponding block and a support point of each adjusting means (380) on the lever (210) and on the other hand a distance (D1) between the rotation axis (232) and a support point (365) of the lever (350) on each bearing part (310) is greater than 2.

17. The die according to claim 13, characterized in that end surfaces (104, 204) of the blocks (100, 200) which extend in a general direction transversal to the flow plane (101) adjacent to the outlet mouthpiece (112) of the duct are concave.

18. The die according to claim 13, characterized in that the deformable portion (220) has a substantially constant thickness over its entire length, but has a projecting rib (223)

forming an excess thickness at the level of its free end (222) adjacent to the outlet of the die to serve as restraint for the biasing means (300).

* * * * *